United States Patent
Sauvage et al.

(10) Patent No.: US 6,936,823 B2
(45) Date of Patent: Aug. 30, 2005

(54) X-RAY DETECTOR COMPRISING A PLURALITY OF CAMERAS SHARING COMMON FIELD OF VIEW

(75) Inventors: Francis Sauvage, Moirans (FR); Régis Guillemaud, La Tronche (FR)

(73) Assignee: Commissariat a l'Energie Atomique, Paris (FR)

(*) Notice: Subject to any disclaimer, the term of this patent is extended or adjusted under 35 U.S.C. 154(b) by 249 days.

(21) Appl. No.: 10/296,933
(22) PCT Filed: Mar. 27, 2002
(86) PCT No.: PCT/FR02/01067
  § 371 (c)(1),
  (2), (4) Date: Nov. 27, 2002
(87) PCT Pub. No.: WO02/079804
  PCT Pub. Date: Oct. 10, 2002
(65) Prior Publication Data
  US 2003/0133540 A1 Jul. 17, 2003
(30) Foreign Application Priority Data
  Mar. 30, 2001 (FR) .............................. 01/04345
(51) Int. Cl.[7] ................................. G01V 5/00
(52) U.S. Cl. ............ 250/368; 250/370.11; 250/370.09; 378/98.3; 378/98
(58) Field of Search ................................ 378/98.3, 98.8, 378/98; 250/366–369, 370.09, 370.1, 370.11, 336.1

(56) References Cited

U.S. PATENT DOCUMENTS

| | | | | |
|---|---|---|---|---|
| 4,076,984 A | * | 2/1978 | Gromov et al. | 250/367 |
| 4,297,580 A | | 10/1981 | Juner et al. | 250/368 |
| 5,235,191 A | * | 8/1993 | Miller | 250/486.1 |
| 6,038,286 A | | 3/2000 | Wägli et al. | 378/98.3 |

* cited by examiner

Primary Examiner—Edward J. Glick
Assistant Examiner—Elizabeth Keaney
(74) Attorney, Agent, or Firm—Thelen Reid & Priest, LLP

(57) ABSTRACT

The cameras (10) of this X-ray detector are all mounted on a common rigid plate (1) by a surface support and screwed to ensure their optical distance from a scintillator (7) itself mounted on the plate (1) by an enclosure (6) forming a darkroom (8). The common mounting of the principal elements of the detector on a single rigid plate thus significantly reduces image deterioration produced by deformations of the detector, of thermal or mechanical origin.

7 Claims, 3 Drawing Sheets

US 6,936,823 B2

X-RAY DETECTOR COMPRISING A PLURALITY OF CAMERAS SHARING COMMON FIELD OF VIEW

FIELD OF THE INVENTION

The present invention relates to an X-ray detector, intended to receive an image taken with X-rays after converting it into light rays.

BACKGROUND OF THE INVENTION

Such detectors comprise a scintillator consisting of a membrane intercepting the X-rays and containing a material producing photons when hit by these rays, together with a camera system comprising a detection part preceded by an appropriate lens, placed behind the scintillator. The camera and the scintillator are fixed on a mounting uniting them and furthermore comprising an enclosure forming a darkroom between the scintillator and the camera system. In many detectors, the system is composed of a plurality of cameras sharing the field of vision and whose measurements are compiled by an electronic system to reconstitute a global image bigger than any a single camera could take.

Designers have to overcome the problem of maintaining a constant focal distance between the scintillator and the cameras, to avoid the risk of producing a blurred image. The causes of deformation are even more acute with large dimension detectors comprising a plurality of cameras. Measures have to be taken not only against mounting imprecision but also against deformations of the frame, of thermal or mechanical origin, resulting from the weight of the elements and the high temperatures they often have to withstand. In practice, prior art detectors do not provide sufficient guarantees of reliability. Thus, a detector comprises a frame in the form of a square box enclosing the darkroom. The scintillator is on the top face of the box, and the cameras are fixed to the four lateral faces. This mounting is very sensitive to deformations of the frame.

BRIEF DESCRIPTION OF THE INVENTION

From this point of view, the invention represents a significant advance for X-ray detectors. It relates to a detector comprising a plurality of cameras sharing a field of vision and comprising a lens preceding a detection part as well as a scintillator preceding the cameras and a frame comprising, in particular, a darkroom enclosure, as mentioned above; its originality lies in the fact that the frame comprises a pierced rigid plate in front of the cameras, the cameras being directly fixed on the lower face of the rigid plate, and the darkroom enclosure being directly fixed on the upper face of the rigid plate and comprising an upper opening around which the scintillator is set.

The essential elements of the detector are thus set on a single structural part of the frame, only slightly subject to deformation because of its rigidity. If deformations occur on the plate, they are essentially linear, and thus do not provoke flexion, and lower image quality less: it has been observed that angular movements of the cameras are the most harmful.

In a preferred embodiment, the cameras are fixed on the lower face of the rigid plate around the latter's respective openings, perforated in front of the lenses. The fixation points are therefore concentric with the camera axes, thus improving their stability. They are also close to the centre of the plate and thus are only subject to slight elongations of the plate with heating.

The rigidity of the plate can be increased by stiffening it with a traditional structure in the darkroom enclosure.

Other aspects, properties and advantages of the invention will be described below with reference to FIGS. 1, 2 and 3.

DETAILED DESCRIPTION

Figure 1:
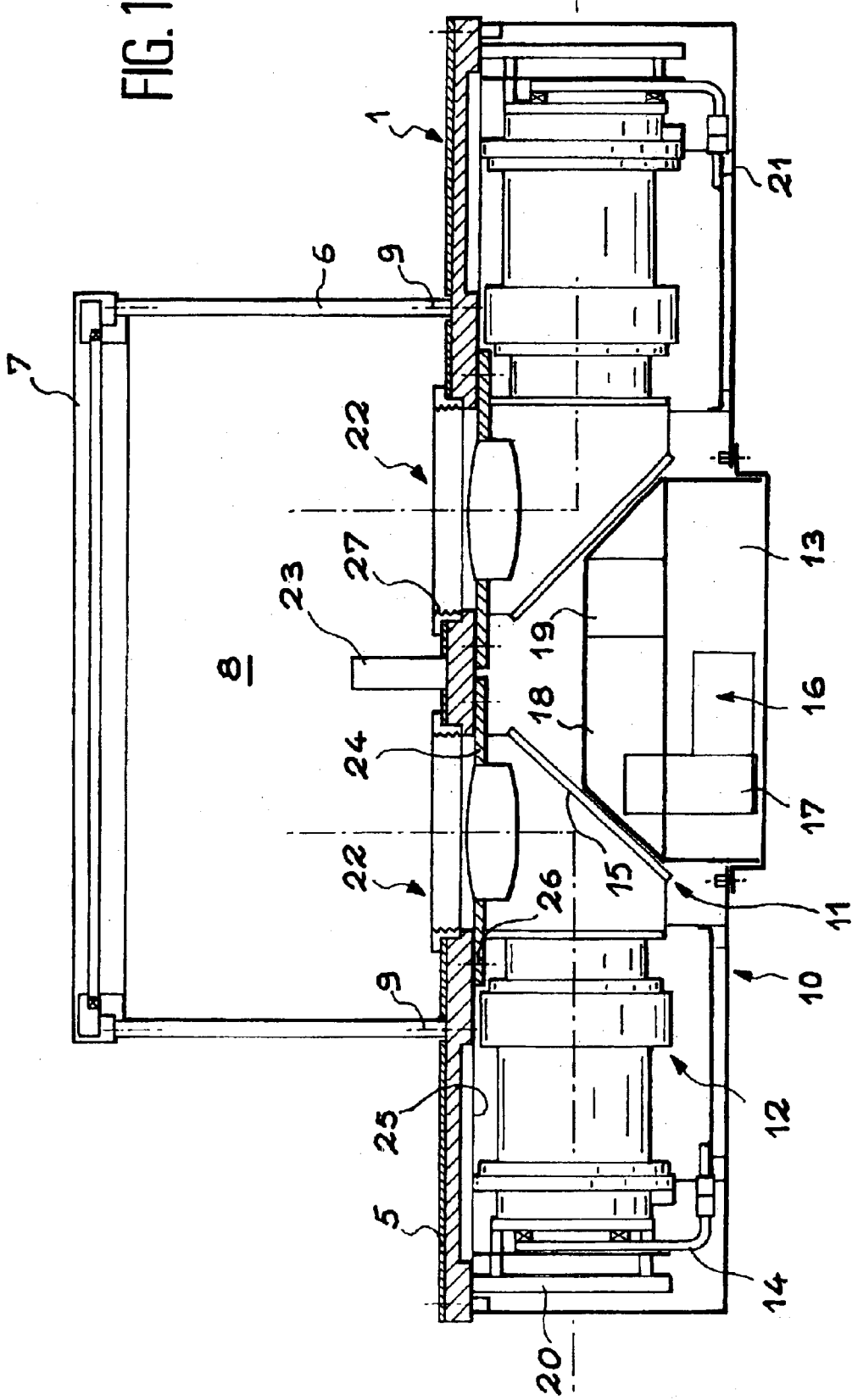
FIG. 1 is a diagram schematically illustrating a view of the apparatus from the side, generally in cross-section.
Figure 2:
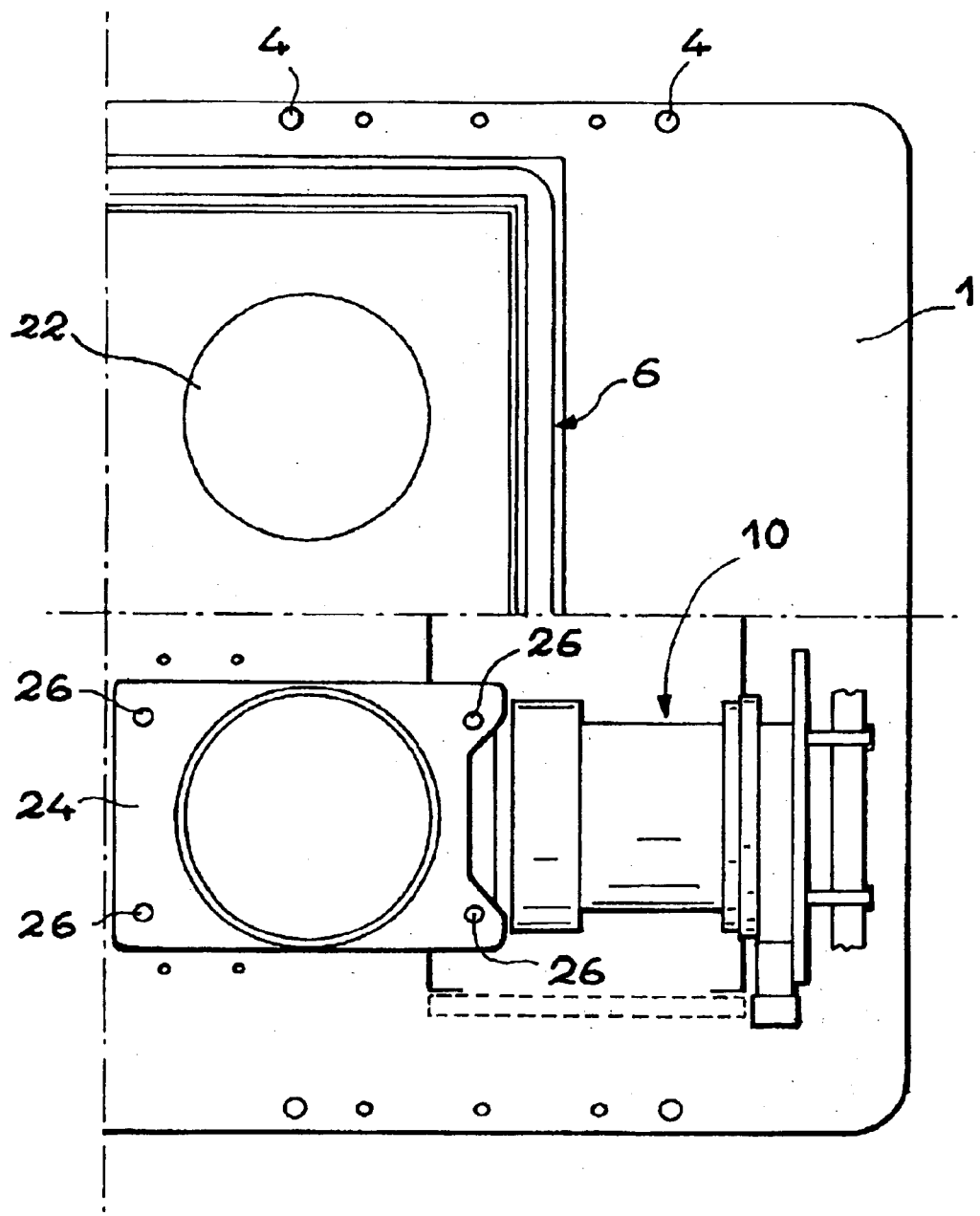
FIG. 2 is a diagram schematically illustrating a view of the apparatus from above, generally in cross-section.
Figure 3:
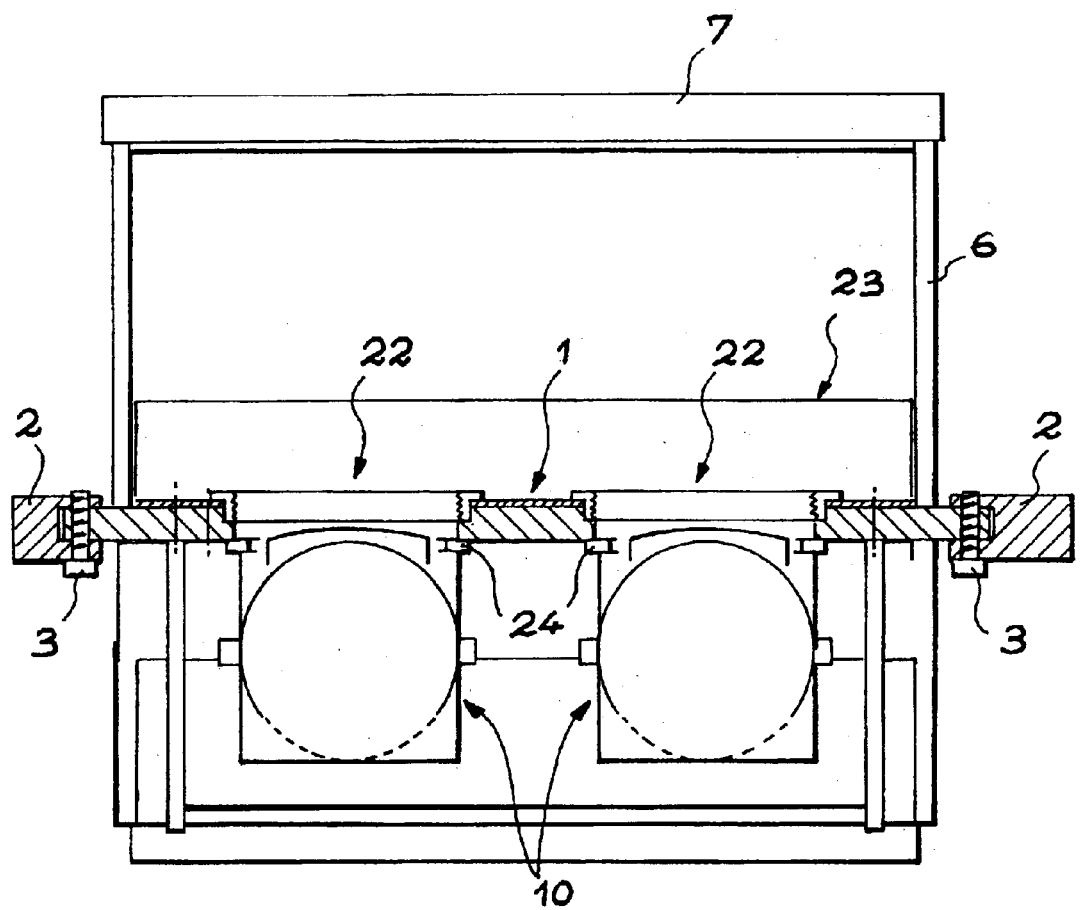
FIG. 3 is a diagram schematically illustrating a view of the apparatus from the front, generally in cross-section.

An essential element of the detector is a central and rigid plate 1 onto which most of the other elements are fixed. It is made of a metal alloy with high mechanical resistance and therefore can be made out of Fortal HR, an aluminium alloy with resistance comparable to that of steel and also with lower weight and smaller expansion coefficient. Thermal or mechanical deformations, produced in particular by the very weight of the detector itself, are thus reduced. It should be noted that the detector is designed to be placed at orientations and in different mountings without any risk of the image quality being disturbed. Parts of the detector mounting, belonging to a stand have reference 2; the mounting can be ensured by screws 3 threaded through drill-holes 4 at the edges of the plate 1.

The plate 1 has a lead coating 5 on its upper face in order to stop any parasitic X-radiation. On its upper face there is an enclosure 6 with square cross-section provided with an upper opening. A scintillator 7 is mounted on this opening with its periphery screwed on the upper edge of the enclosure 6. The volume surrounded by the enclosure 6 and covered by the scintillator 7 forms a darkroom 8. The enclosure 6 is attached to the plate 1 by screws 9 and pins (axes shown) attached underneath.

There are four cameras and each has the general reference 10. They comprise a lens 11 in front, and then a detection element 12 making it possible to convert a light image into a digital image. An electronic unit 13 common to all the cameras 10 is arranged in the centre and at the bottom of the detector; cables 14 link it to the detection elements 12. The detection elements 12 are mounted opposite each other in pairs, meaning that they have aligned aiming axes directed towards each other; furthermore, the pairs of aligned axes are parallel in the longitudinal direction of the plate 1.

However, the aiming axes are all parallel and vertical to the camera outlet 10. This is achieved by providing the lenses 11 with an angled mirror 15. A central volume located under the mirrors 15 contains not only the electronic unit 13 but also a cooling assembly 16, essentially comprising a pump 17, a heat exchanger 18 and a ventilator 19. Cooling of the cameras 10 can be completed by heat sinks 20 set behind them. All these elements are enclosed by a lower cover 21 without any special rigidity and with edges screwed into the plate 1.

Detection is made possible by providing the plate 1 with openings 22 in front of the respective lenses 11 of the cameras 10. These openings 22 do not necessarily affect the rigidity of the plate 1, but a traditional stiffening structure, such as a rib 23 with rectangular cross-section, can be set across the plate 1 in the darkroom 8 if necessary. Cohesion of the cameras 10 is maintained by an enclosure comprising, in particular, a mounting plate 24, placed in front of the lens 11. The mounting plates 24 are set against the lower face 25 of the plate 1 and connected to it by screws 26 (shown by their axes), numbering four per camera 10, concentric with the aiming axis of the lens 11. This mounting makes it possible to place the cameras 10 at a clearly defined position in the detector: the elements of the lens 11 are, in particular, at a practically unvarying distance from the scintillator 7. The anti-reflection rings 27 are also shown, mounted in the openings 22, and comprising an internal absorption threading for radiations touching these rings.

The rigidity of the plate 1 reduces its deformation despite its relatively high surface area, and the low expansion coefficient of the material comprising it reduces its sensitivity to heating; the position of the cameras is ensured and maintained by the precise mounting provided by the surface contacts of the mounting plates 24 against the rigid plate 1; the cameras 10 are not supported at any other place, neither by the plate 1 nor by any other frame element, such that the most significant deformations, which could take place at the edge of the plate 1, following flexion or heating in particular, do not affect the orientation of the cameras 10. Finally, the mounting of the enclosure 6 on the plate 1 will not transmit deformations which could have the detrimental effect of warping the scintillator 7 and thus modifying its focal distance from the cameras 10, and even less if the material of the enclosure 6 is the same as that of the plate 1 and thus with the same expansion coefficient.

What is claimed is:

1. X-ray detector comprising a plurality of cameras (10) sharing a field of vision and comprising a lens (11) preceding a detection element (12), a scintillator (7) preceding the cameras (10) and a frame comprising in particular a darkroom (8) enclosure (6), wherein the frame comprises a perforated (22) rigid plate (1) in front of the cameras (10), the cameras being directly fixed on the lower face of the rigid plate, and the darkroom enclosure being directly fixed on the upper face of the rigid plate and comprising an upper opening around which the scintillator is set.

2. X-ray detector according to claim 1, characterised in that the cameras (10) are fixed on the lower face of the rigid plate (1) around respective openings (22) of the rigid plate, perforated in front of the lenses.

3. X-ray detector according to claim 1, characterised in that it comprises a stiffening structure (23) for the rigid plate in the darkroom enclosure.

4. X-ray detector according to claims 1, characterised in that the lenses comprise an angled mirror (15) and the detection elements (12) of the cameras are directed in convergent directions in pairs.

5. X-ray detector according to claim 4, characterised in that it comprises a cooling module (17, 18, 19) under the angled mirrors.

6. X-ray detector according to claim 1, characterised in that the rigid plate is made of an aluminium alloy.

7. X-ray detector according to claim 1, characterised in that the rigid plate (1) and the enclosure (6) are made of the same material.

* * * * *